Feb. 6, 1940. J. W. RIEF 2,189,654
NUT LOCK
Filed Sept. 22, 1936

INVENTOR
JOSEPH W. RIEF
BY Albert L. Ely
ATTORNEY

Patented Feb. 6, 1940

2,189,654

UNITED STATES PATENT OFFICE 2,189,654

NUT LOCK

Joseph W. Rief, Montreal, Quebec, Canada, assignor to The Enterprise Manufacturing Company, Akron, Ohio, a corporation of Ohio Application September 22, 1936, Serial No. 101,932

1 Claim. (Cl. 151—52)

This invention relates to nut locks, and more especially it relates to nut locks for fishing reels whereby the nut that holds the crank upon the spool driving shaft of the reel is prevented from accidently being removed therefrom.

In reels of this character the crank is mounted upon a shaft and is secured in place by a nut, usually in the form of a cap nut having screw-threaded engagement with the end of the shaft. This nut often becomes loosened by the operation of the crank and it is the purpose of the invention to provide for a simple means by which the nut will be held securely in place. The means shown and described herein is adaptable to existing types of reels and can be easily applied and removed.

In the drawing in which the best known or preferred form of the invention is shown:

Figure 1:
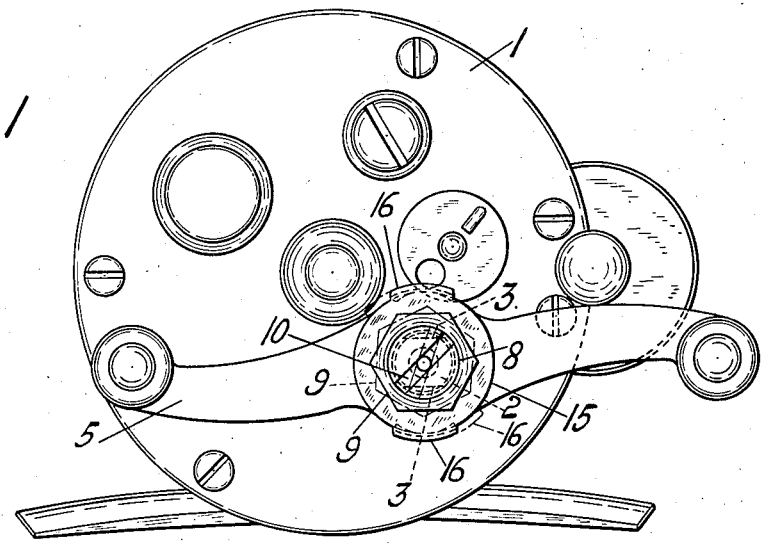
Fig. 1 is a side elevation of a reel structure of well known or standard make to which the invention is applied.
Figure 2:
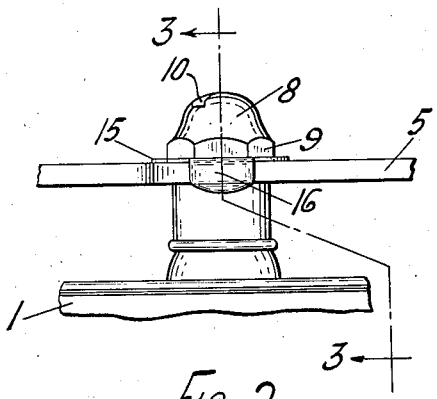
Fig. 2 is a fragmentary side view of the crank.
Figure 3:
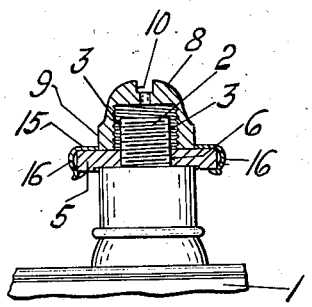
Fig. 3 is a section on the line 3—3 of Fig. 2.
Figure 4:
Fig. 4 is a detail view of the attachment.

The reel comprises the usual reel body 1 which may be of any design. The shaft for operating the reel is shown at 2 being formed with a screw-threaded end having two flattened surfaces 3. Over the end of the shaft is located the crank 5, the center of which is formed with an aperture 6 to receive the end of the shaft having flattened sides to form a driving engagement therewith.

Over the end of the shaft is received the cap-nut 8 usually formed with a hex-shaped base 9 to receive a wrench and a kerf 10 for screw driver operation.

To prevent the rotation of the nut when screwed into place, there is provided a light metal washer or disk 15, preferably made of spring steel, the center of which is formed with an opening to receive and fit over the base of the nut. On opposite sides the washer is formed with two lips or wings 16 turned downwardly from the body and usually formed with rounded lower edges so as to aid in passing over the handle, and to hold the disk in place by frictional engagement with the sides of the crank.

The crank is usually provided with arcuate medial portions that are concentric with the shaft 2, and it is intended that the wings 16 are narrower than the linear extent of said concentric portions of the crank and engage those portions of the crank between the crank arms. The purpose of this construction is to insure that, at whatever position the nut is located when screwed tightly in place, the disk will engage the sides of the crank. Thus, as shown in dotted and full lines in Fig. 1, the disk has a considerable travel to either side, sufficient to insure the proper seating of the disk at whatever position the nut assumes when in tight engagement with the crank.

To apply the disk it is only necessary to slip it over the nut, adjust it to the proper position and then press down until the lips snap into place on the handle. To release the nut the lips are pressed outwardly and the disk lifted off the nut. The disk is preferably made of spring steel so that the lips will hold the disk in place, it being the practice to form the lips slightly closer together than the width of the crank at its central portion.

While it is preferred to have the disk engage the nut portion of the cap, it may engage the kerf or any other part provided that the nut cannot turn relative to the disk. The rotation of the disk and screw cap is limited by the extending crank arms in the preferred form of the invention.

What is claimed is:

A nut lock for a fishing reel that comprises a shaft, a crank on the end of the shaft formed with margins that have arcuate, diametrically opposed medial regions concentric with said shaft, and a nut on the shaft to hold the crank in position thereon, said lock consisting of a disk fitting about the nut in engagement with the flat faces thereof, and two spring wings extending from the disk and adapted frictionally to engage the arcuate marginal portions of the crank, the width of said wings being substantially less than the linear extent of said arcuate portions of the crank so that said wings will engage said arcuate portions in all angular positions of the nut.

JOSEPH W. RIEF.